US012700780B2

(12) United States Patent
Ueda et al.

(10) Patent No.: US 12,700,780 B2
(45) Date of Patent: Aug. 4, 2026

(54) METHOD OF MANUFACTURING STATOR

(71) Applicant: NHK SPRING CO., LTD., Yokohama (JP)

(72) Inventors: Ryosuke Ueda, Yokohama (JP); Yuji Hirota, Yokohama (JP); Hiromasa Omata, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 599 days.

(21) Appl. No.: 18/260,717

(22) PCT Filed: Jun. 29, 2022

(86) PCT No.: PCT/JP2022/026099
§ 371 (c)(1),
(2) Date: Jul. 7, 2023

(87) PCT Pub. No.: WO2023/008070
PCT Pub. Date: Feb. 2, 2023

(65) Prior Publication Data
US 2024/0305177 A1 Sep. 12, 2024

(30) Foreign Application Priority Data
Jul. 28, 2021 (JP) .................................. 2021-123669

(51) Int. Cl.
*H01F 7/06* (2006.01)
*B21F 3/02* (2006.01)
*H02K 15/064* (2025.01)

(52) U.S. Cl.
CPC ............. *H02K 15/064* (2013.01); *B21F 3/02* (2013.01)

(58) Field of Classification Search
CPC ...... B21F 3/02; H02K 15/064; H02K 15/085; Y02T 10/64
See application file for complete search history.

(56) References Cited

U.S. PATENT DOCUMENTS 6,557,239 B2 5/2003 Takahashi et al.
9,018,822 B2 * 4/2015 Okimitsu ................. H02K 3/12
310/260

(Continued)

FOREIGN PATENT DOCUMENTS

EP 1376828 A1 1/2004
JP A 2005-006364 1/2005

(Continued)

OTHER PUBLICATIONS

International Search Report (with English translation) for Application No. PCT/JP2022/026099, mailed on Aug. 16, 2022, 4 pages.

*Primary Examiner* — Paul D Kim
(74) *Attorney, Agent, or Firm* — Dority & Manning, PA

(57) ABSTRACT
A production method for a stator involves forming leg parts of rectangular wire coils such that the leg part that is on one side in the circumferential direction of a stator core is longer in the axial direction of the stator core than the leg part that is on the other side in the circumferential direction. At each layer of every slot, the leg part on the one side of one rectangular wire coil is laid on the outside in the radial direction of the leg part on the other side of another rectangular wire coil. A second jig is pressed against the plurality of rectangular wire coils from one side in the axial direction toward the other side in the axial direction. As a result of this pressing, only the tip of the leg part on the one side of each layer is pressed against a respective step of a stepped part of a first jig.

11 Claims, 15 Drawing Sheets

(56) References Cited

U.S. PATENT DOCUMENTS

| | | | |
|---|---|---|---|
| 11,863,036 B2 * | 1/2024 | Koga | .................... H02K 15/35 |
| 2022/0294320 A1 * | 9/2022 | Koga | ...................... H02K 3/50 |

FOREIGN PATENT DOCUMENTS

| | | |
|---|---|---|
| JP | A 2020-099153 | 6/2020 |
| JP | A 2020-110025 | 7/2020 |
| JP | A 2021-078257 | 5/2021 |

* cited by examiner

METHOD OF MANUFACTURING STATOR

CROSS-REFERENCE TO RELATED APPLICATIONS

The present application is a US national phase entry of International Patent Application No. PCT/JP2022/026099, filed on Jun. 29, 2022, which is based upon and claims the right of priority to JP 2021-123669, filed on Jul. 28, 2021, the disclosures of both of which are hereby incorporated by reference herein in their entirety for all purposes.

TECHNICAL FIELD

The present disclosure relates to a method of manufacturing a stator.

BACKGROUND ART

Japanese Patent Application Laid-Open (JP-A) No. 2020-99153 discloses a stator manufacturing device that arrays numerous segment coils that are formed in U-shapes and are inserted in a stator core. This device has a stator core supporting portion, a coil guide, and a lead pushing plate. The stator core supporting portion supports the stator core. The coil guide restricts the amounts of protrusion of central portions of the numerous segment coils, such that the central portions do not protrude-out more than a preset distance from the stator core. The lead pushing plate has urging members that urge the end portions of the numerous segment coils in the direction of the coil guide, such that the central portions of the numerous coils abut the coil guide. The machining dispersion of the segment coils is absorbed by the urging members, and the accuracy of arraying the segment coils is improved.

SUMMARY OF INVENTION

Technical Problem

In the prior art technique disclosed in (JP-A) No. 2020-99153, because the central portions of the numerous segment coils (rectangular wire coils) abut the coil guide, the amounts of protrusion of the respective central portions from the stator core are uniform. However, because the end portions of the respective rectangular wire coils (the distal ends of the legs) are urged in the direction of the coil guide by the urging members, dispersion arises in the positions of the distal ends of the respective leg portions. As a result, for example, there is the problem that it is difficult to automate the post-process of bending the distal end sides of the respective leg portions into a predetermined shape.

In view of the above-described circumstances, an object of the present disclosure is to provide a method of manufacturing a stator that can prevent or suppress dispersion in the positions of the distal ends of leg portions of numerous rectangular wire coils that are arrayed at a stator core.

Solution to Problem

A method of manufacturing a stator of a first aspect is a method of manufacturing a stator in which numerous rectangular wire coils, which are shaped in U-shapes having both leg portions respectively inserted into respective slots of a stator core from one side in an axial direction of the stator core, are superposed in a plurality of layers in a radial direction of the stator core and are arrayed in annular forms, the method comprising: setting lengths in the axial direction of the both leg portions of the rectangular wire coils such that the lengths become longer in a stepwise manner from a layer at an inner side toward a layer at an outer side of the plurality of layers; of the both leg portions of each of the rectangular wire coils, forming a leg portion at one side in a peripheral direction of the stator core to be longer in the axial direction than a leg portion at another side in the peripheral direction; within the respective slots and at each of the layers, superposing the leg portion at the one side of one of the rectangular wire coils on an outer side in the radial direction of the leg portion at the other side of another of the rectangular wire coils; placing a first jig, which has a stepped portion shaped in a form of steps heading downward toward an outer side in the radial direction, at another side in the axial direction with respect to the numerous rectangular wire coils, and making respective steps of the stepped portion face the layers, respectively; causing a second jig to abut the numerous rectangular wire coils from the one side in the axial direction, and pushing the second jig toward the other side in the axial direction; and of the leg portions at the one sides and the leg portions at the other sides of the respective layers, causing only distal ends of the leg portions at the one sides to abut the steps, respectively.

In the method of manufacturing a stator of the first aspect, the numerous rectangular wire coils, which are shaped in U-shapes having both leg portions respectively inserted into respective slots of a stator core from one side in the axial direction of the stator core, are superposed in plural layers in a radial direction of the stator core and are arrayed in annular forms. The lengths in the axial direction of the both leg portions of the rectangular wire coils are set so as to become longer in a stepwise manner from a layer at an inner side toward a layer at an outer side of the plural layers. Of the both leg portions of each rectangular wire coil, the leg portion at one side in the peripheral direction of the stator core is formed to be longer in the axial direction than the leg portion at the other side in the peripheral direction. Within the respective slots and at each of the layers, the leg portion at the one side of one of the rectangular wire coils is superposed on the radial direction outer side of the leg portion at the other side of another of the rectangular wire coils. The first jig, which has a stepped portion shaped in the form of steps heading downward toward the outer side in the radial direction, is placed at the other side in the axial direction with respect to the numerous rectangular wire coils, and the respective steps of the stepped portion are made to face the layers, respectively. The second jig is made to abut the numerous rectangular wire coils from the one side in the axial direction, and is pushed toward the other side in the axial direction. Of the leg portions at the one sides and the leg portions at the other sides of the respective layers, only the distal ends of the leg portions at the one sides are made to abut the steps of the stepped portion, respectively. Due thereto, because the positions of the distal ends of the leg portions at one sides of the respective layers are arranged at the positions of the respective steps, dispersion arising in the positions of the distal ends of the leg portions of the numerous rectangular wire coils can be prevented or suppressed. As a result, it is easy to automate, for example, a post-process of bending the distal end sides of the respective leg portions in substantial crank shapes toward the outer side in the radial direction.

In a method of manufacturing a stator of a second aspect, in the first aspect, the numerous rectangular wire coils are moved toward the other side in the axial direction relative to the stator core, in a state in which the first jig and the second jig are made to abut the numerous rectangular wire coils.

In the manufacturing method of the second aspect, due to the above-described relative movement, the numerous rectangular wire coils are pushed-in toward the other side in the axial direction with respect to the stator core. Due to this pushing-in being carried out in the above-described abutting state, dispersion in the positions of the distal ends of the leg portions of the numerous rectangular wire coils after the pushing-in can be prevented or suppressed.

In a method of manufacturing a stator of a third aspect, in the first aspect, after the first jig and the second jig are made to abut the numerous rectangular wire coils, the numerous rectangular wire coils are moved toward the other side in the axial direction relative to the stator core in a state in which the first jig has been moved apart from the numerous rectangular wire coils.

In the method of manufacturing a stator of the third aspect, the first jig and the second jig are made to abut the numerous rectangular wire coils, and the positions of the distal ends of the leg portions at the one sides of the respective rectangular wire coils are arranged at the positions of the respective steps at the stepped portion of the first jig. Thereafter, due to the above-described relative movement being carried out in a state in which the first jig has been moved apart from the numerous rectangular wire coils, the numerous rectangular wire coils are pushed-in toward the other side in the axial direction with respect to the stator core. Due to this pushing-in being carried out in the state in which the positions of the distal ends of the leg portions at the one sides of the respective rectangular wire coils are arranged as described above, dispersion in the positions of the distal ends of the leg portions of the numerous rectangular wire coils after the pushing-in can be prevented or suppressed.

In a method of manufacturing a stator of a fourth aspect, in the second aspect or the third aspect, the stepped portion of the first jig is formed so as to be able to be inserted into the respective slots from the other side in the axial direction, and the numerous rectangular wire coils are made to abut the respective steps of the stepped portion that is inserted in the respective slots.

In the method of manufacturing a stator of the fourth aspect, the stepped portion of the first jig is formed so as to be able to be inserted into the respective slots from the other side in the axial direction of the stator core. The numerous rectangular wire coils are made to abut the respective steps of the stepped portion that is inserted in the respective slots. Because the abutting of the numerous rectangular wire coils with the respective steps of the stepped portion is carried out within the respective slots in this way, it is easy to make the numerous rectangular wire coils accurately abut the respective steps.

A method of manufacturing a stator of a fifth aspect is a method of manufacturing a stator in which numerous rectangular wire coils, which are shaped in U-shapes having both leg portions respectively inserted into respective slots of a stator core from one side in an axial direction of the stator core, are superposed in a plurality of layers in a radial direction of the stator core and are arrayed in annular forms, the method comprising: setting lengths in the axial direction of the rectangular wire coils such that the lengths become longer in a stepwise manner from a layer at an inner side toward a layer at an outer side of the plurality of layers; of the both leg portions of each of the rectangular wire coils, forming a leg portion at one side in a peripheral direction of the stator core to be longer in the axial direction than a leg portion at another side in the peripheral direction; within the respective slots and at each of the layers, superposing the leg portion at the one side of one of the rectangular wire coils on an outer side in the radial direction of the leg portion at the other side of another of the rectangular wire coils; placing a first jig, which has a stepped portion shaped in a form of steps heading downward toward an outer side in the radial direction, at another side in the axial direction with respect to the numerous rectangular wire coils, and making respective steps of the stepped portion face the leg portions of the respective layers, respectively; causing a second jig to abut the numerous rectangular wire coils from the one side in the axial direction, and pushing the second jig toward the other side in the axial direction; and causing distal ends of the leg portions of the respective layers to abut the steps, respectively.

In the method of manufacturing a stator of the fifth aspect, the numerous rectangular wire coils, which are shaped in U-shapes having both leg portions respectively inserted into respective slots of a stator core from one side in the axial direction of the stator core, are superposed in plural layers in a radial direction of the stator core and are arrayed in annular forms. The lengths in the axial direction of the rectangular wire coils are set so as to become longer in a stepwise manner from a layer at an inner side toward a layer at an outer side of the plural layers. Of the both leg portions of each rectangular wire coil, the leg portion at one side in the peripheral direction of the stator core is formed to be longer in the axial direction than the leg portion at another side in the peripheral direction. Within the respective slots and at each of the layers, the leg portion at the one side of one of the rectangular wire coils is superposed on the radial direction outer side of the leg portion at the other side of another of the rectangular wire coils. The first jig, which has a stepped portion shaped in a form of steps heading downward toward the outer side in the radial direction, is placed at the other side in the axial direction with respect to the numerous rectangular wire coils, and the respective steps of the stepped portion are made to face the leg portions of the layers, respectively. The second jig is made to abut the numerous rectangular wire coils from the one side in the axial direction, and is pushed toward the other side in the axial direction. The distal ends of the leg portions of the respective layers are made to abut the steps of the stepped portion, respectively. Due thereto, because the positions of the distal ends of the leg portions of the respective layers are arranged at the positions of the respective steps, dispersion arising in the positions of the distal ends of the leg portions of the numerous rectangular wire coils can be prevented or suppressed. As a result, it is easy to automate, for example, a post-process of bending the distal end sides of the respective leg portions in substantial crank shapes toward the outer side in the radial direction.

In a method of manufacturing a stator of a sixth aspect, in the fifth aspect, the stepped portion of the first jig is formed such that steps whose heights in the axial direction are tall and steps whose heights in the axial direction are short are lined-up alternately, and the leg portions at the one sides are made to abut the steps whose heights in the axial direction are tall, and the leg portions at the other sides are made to abut the steps whose heights in the axial direction are short.

In the method of manufacturing a stator of the sixth aspect, the stepped portion of the first jig is formed such that steps whose heights in the axial direction are tall and steps whose heights in the axial direction are short are lined-up alternately. The leg portions at the one sides of the respective layers are made to abut the steps whose heights in the axial direction are tall, and the leg portions at the other sides of the respective layers are made to abut the steps whose heights in the axial direction are short. Due thereto, the positions of the distal ends of the respective leg portions can be arranged accurately. As a result, for example, the above-described processing of bending into a crank shape is easy.

In a method of manufacturing a stator of a seventh aspect, in any one of the first aspect through the sixth aspect, the second jig has a plurality of urging portions that urge the numerous rectangular wire coils toward the other side in the axial direction per layer.

In the method of manufacturing a stator of the seventh aspect, the second jig, which is made to abut the numerous rectangular wire coils from the one side in the axial direction, has the plural urging portions that urge the numerous rectangular wire coils toward the other side in the axial direction (the first jig side) per layer. Due thereto, the machining dispersion of the respective rectangular wire coils can be absorbed by these urging portions.

In a method of manufacturing a stator of an eighth aspect, in any one of the first aspect through the seventh aspect, after the numerous rectangular wire coils are pushed by the second jig toward the other side in the axial direction and are moved toward the other side in the axial direction relative to the stator core, the numerous rectangular wire coils are made to abut the first jig in a state in which the second jig has been moved apart from the numerous rectangular wire coils.

In the method of manufacturing a stator of the eighth aspect, the second jig is made to abut the numerous rectangular wire coils, and is pushed toward the other side in the axial direction. Due thereto, the numerous rectangular wire coils are moved toward the other side in the axial direction, relative to the stator core. Thereafter, the first jig is made to abut the numerous rectangular wire coils in a state in which the second jig has been moved apart from the numerous rectangular wire coils. Due thereto, the positions of the distal ends of the leg portions of the numerous rectangular wire coils are arranged.

Advantageous Effects of Invention

As described above, in the method of manufacturing a stator relating to the present disclosure, dispersion in the positions of the distal ends of leg portions of numerous rectangular wire coils that are arrayed at a stator core can be prevented or suppressed.

BRIEF DESCRIPTION OF DRAWINGS

FIG. 8B is a second drawing for explaining the second push-in method of the push-in step.

FIG. 8C is a third drawing for explaining the second push-in method of the push-in step.

FIG. 13A is a first drawing for explaining the push-in step in a method of manufacturing a stator relating to a third embodiment.

FIG. 13B is a second drawing for explaining the push-in step in the method of manufacturing a stator relating to the third embodiment.

DESCRIPTION OF EMBODIMENTS

First Embodiment

Figure 1:
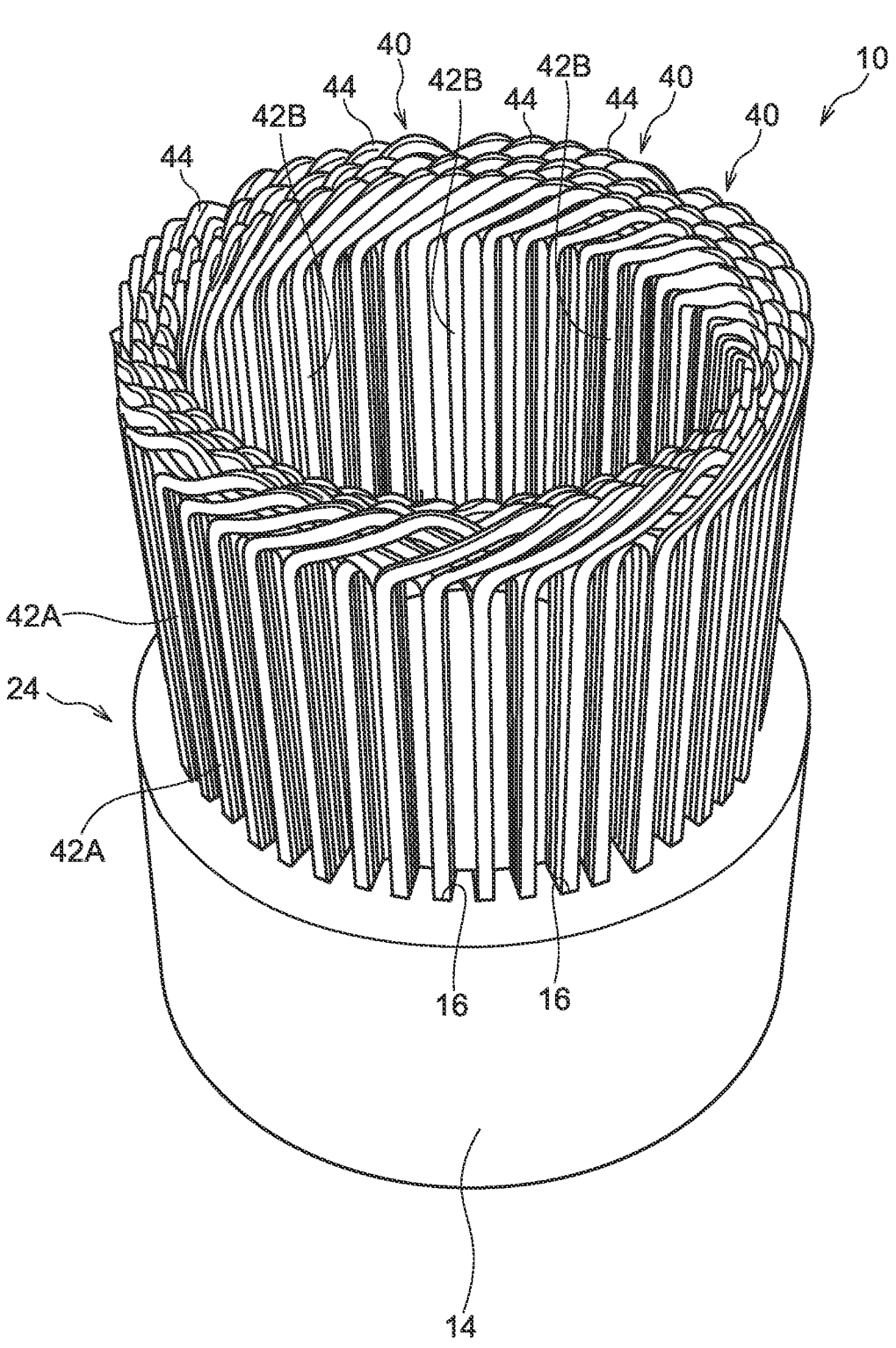
FIG. 1 is a perspective view illustrating a state in the midst of manufacturing a stator by a method of manufacturing a stator relating to a first embodiment.

A method of manufacturing a stator relating to a first embodiment of the present disclosure is described hereinafter with reference to FIG. 1 through FIG. 11B. Note that, in the respective drawings, there are cases in which some of the reference numerals are omitted in order to make the drawings easier to understand. As illustrated in FIG. 1, in the method of manufacturing a stator core relating to the present embodiment, numerous rectangular wire coils 40 are inserted into a stator core 14. The numerous rectangular wire coils 40 are superposed in plural layers in the radial direction of the stator core 14 and are arrayed in annular forms.

The stator core 14 is formed in the shape of a cylindrical tube by numerous electromagnetic steel plates being layered. Numerous slots 16 are formed in the inner peripheral portion of the stator core 14. At the numerous slots 16, the both sides in the axial direction of the stator core 14 and the inner sides in the radial direction are open. Hereinafter, there are cases in which the axial direction of the stator core 14 is simply called the "axial direction", the radial direction of the stator core 14 is simply called the "radial direction", and the peripheral direction of the stator core 14 is simply called the "peripheral direction".

Figure 2A:
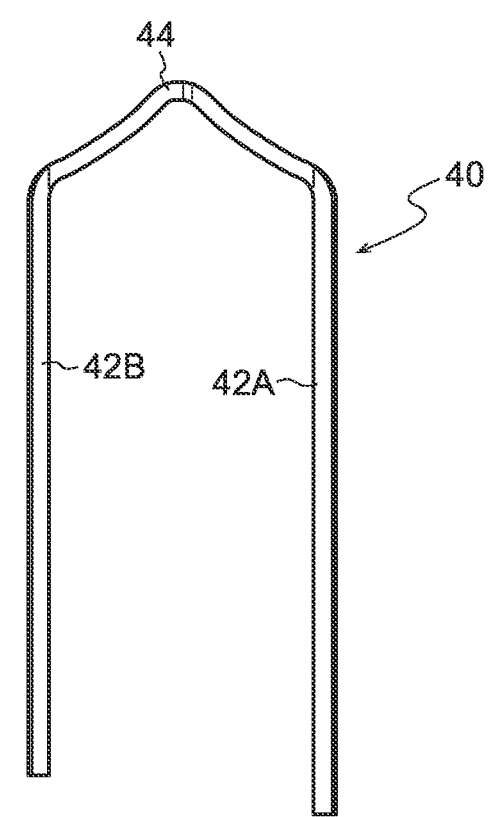
FIG. 2A is a front view illustrating a rectangular wire coil.
Figure 2B:
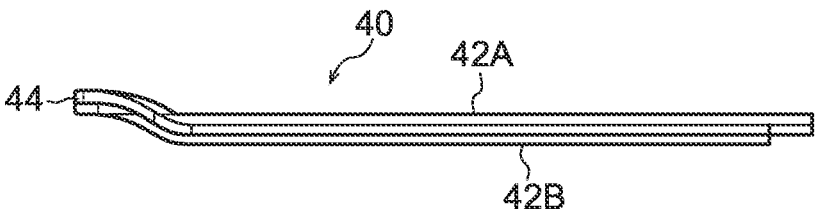
FIG. 2B is a side view illustrating the rectangular wire coil.
Figure 2C:
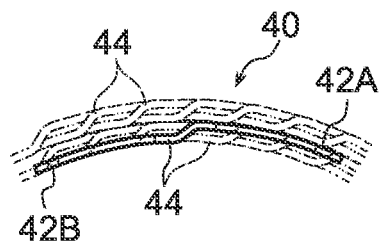
FIG. 2C is a top view illustrating the rectangular wire coil.

As illustrated in FIG. 2A through FIG. 2C, the rectangular wire coil 40 is a structure produced by a rectangular wire that is formed of copper or the like being shaped into a U-shape, and is structured by a pair of leg portions 42A, 42B that extend parallel to one another, and a crank portion 44 connecting one end portions of the pair of leg portions 42A, 42B. The leg portion 42A at one side in the peripheral direction is formed to be slightly longer in the axial direction than the leg portion 42B at the other side in the peripheral direction.

As illustrated in FIG. 2C, the crank portion 44 is bent in the shape of a crank such that one end side thereof is disposed so as to be offset further in the radial direction than the another end side. The rectangular wire coil 40 is structured such that the positional relationship in the radial direction between the leg portion 42A and the leg portion 42B is changed due to this crank portion 44 being formed. Due thereto, the plural rectangular wire coils 40 are layered in the radial direction as illustrated by the two-dot chain lines in FIG. 2C.

Figure 3:
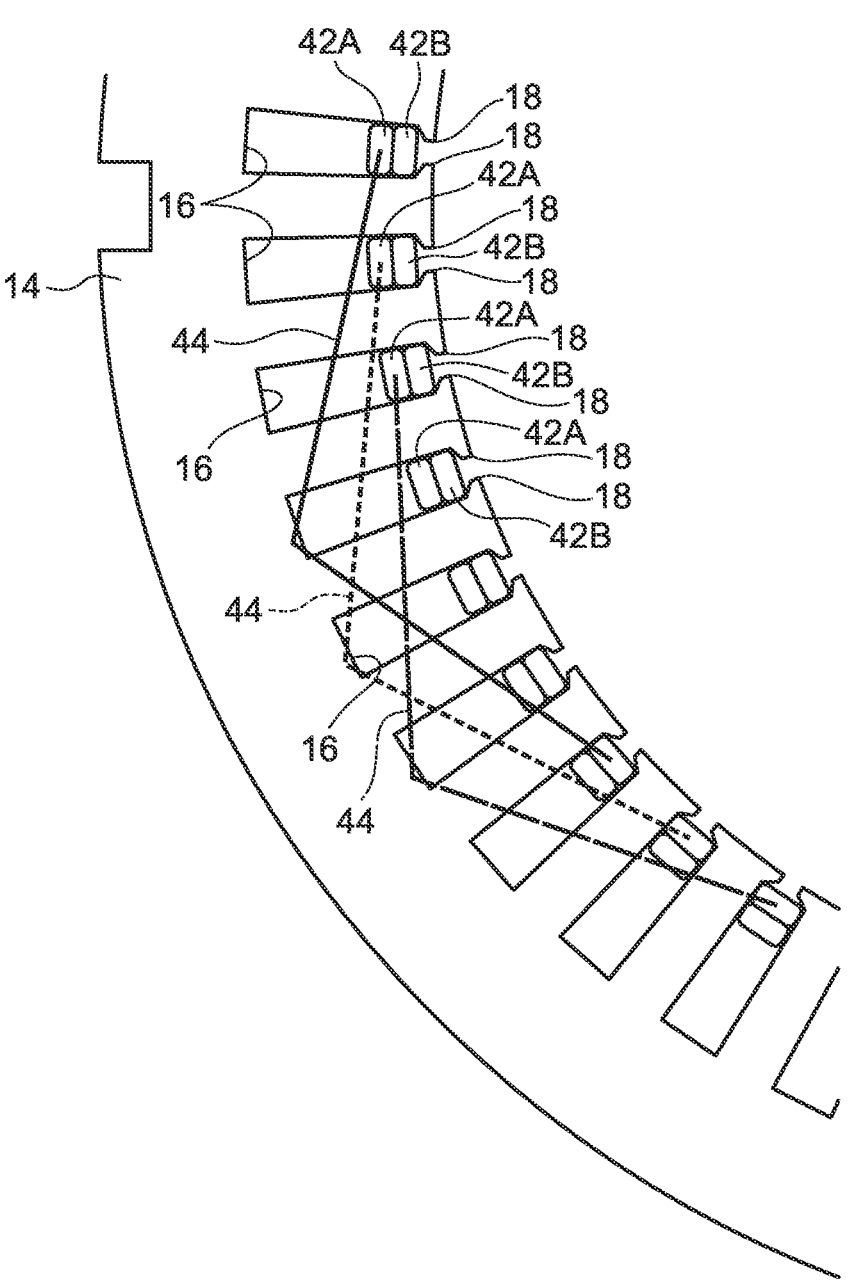
FIG. 3 is a plan view for explaining a method of inserting the rectangular wire coils into respective slots of a stator core.
Figure 4:
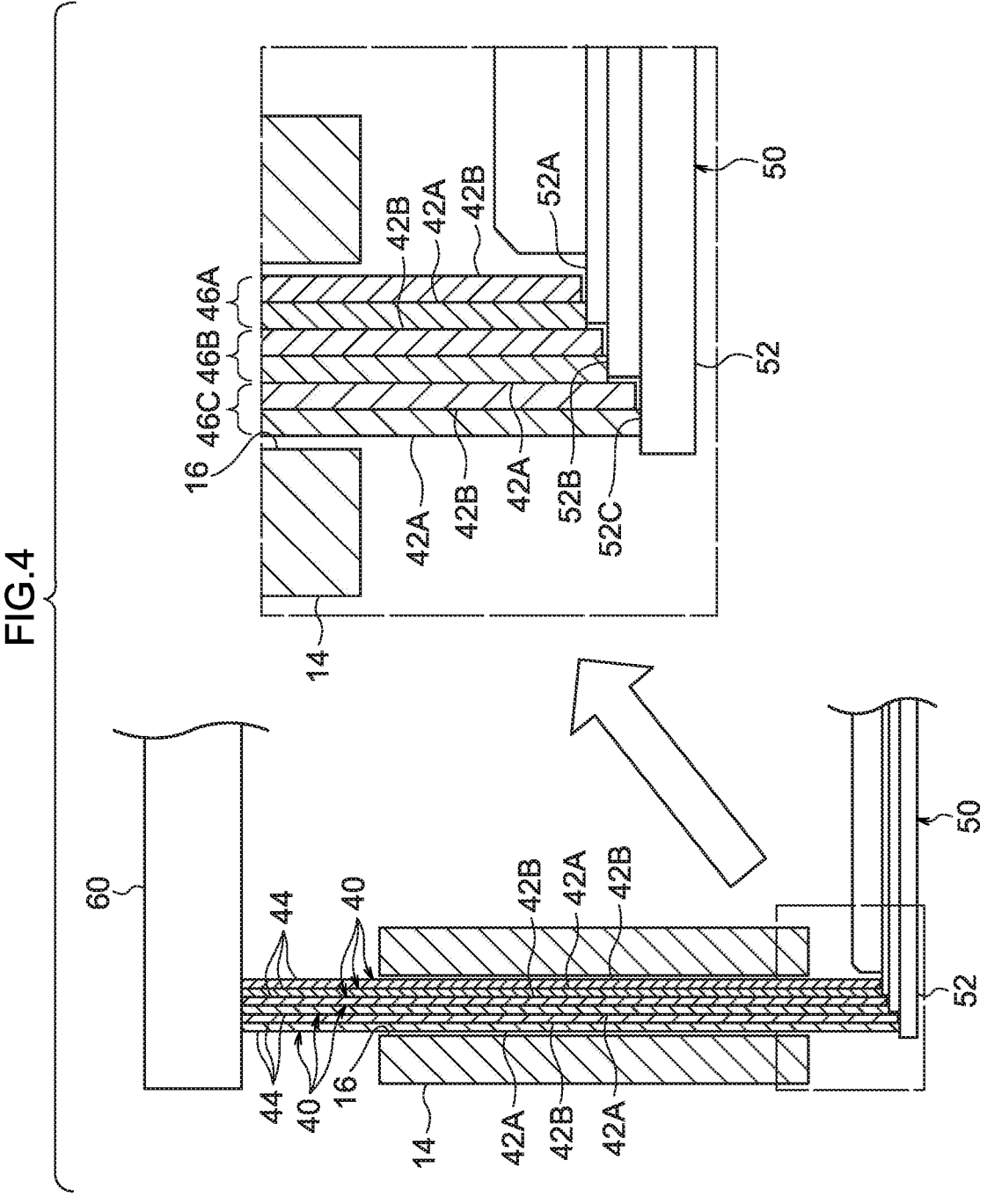
FIG. 4 is a cross-sectional view for explaining a push-in step of the rectangular wire coils.

As illustrated in FIG. 1, at the numerous rectangular wire coils 40, the both leg portions 42A, 42B are respectively inserted into the respective slots 16 of the stator core 14 from an axial direction one side, and the rectangular wire coils 40 are superposed in plural layers in the radial direction of the stator coil 14 and are arrayed in annular forms. As illustrated in FIG. 3, one layer is formed by the rectangular wire coils 40 being successively inserted into the slots 16 one-by-one along the peripheral direction, once around the periphery. In the present embodiment, as illustrated in FIG. 4, three layers 46A, 46B, 46C of the rectangular wire coils 40 are formed. Note that, in the present embodiment, as an example, a stopper portion 18, which prevents the rectangular wire coils 40 from falling out of the slot 16, is formed at the radial direction inner side end portion of each slot 16.

As illustrated in FIG. 4, in the present embodiment, the axial direction lengths of the both leg portions 42A, 42B of the rectangular wire coils 40 are set so as to become longer in a stepwise manner from the layer 46A at the inner side toward the layer 46C at the outer side among the three layers 46A, 46B, 46C. Further, as illustrated in FIG. 3 and FIG. 4, within each of the slots 16, at each of the respective layers 46A, 46B, 46C, the leg portion 42A at one side of one of the rectangular wire coils 40 is superposed on the radial direction outer side of the another leg portion 42B of another one of the rectangular wire coils 40.

Note that, in the inserting of the numerous rectangular wire coils 40 into the stator core 14, for example, a method can be employed in which, by setting the numerous rectangular wire coils 40 in an annular arraying jig, assemblies of the rectangular wire coils 40 that are arrayed in an annular form are formed, and each assembly is inserted one-by-one into the respective slots 16 of the stator core 14. Or, for example, a method may be employed in which the rectangular wire coils 40 are inserted one-by-one into the respective slots 16 of the stator core 14. When either of these methods is employed, the numerous rectangular wire coils 40 are only inserted midway into the respective slots 16 of the stator core 14. Therefore, after the numerous rectangular wire coils 40 are inserted into the respective slots 16 of the stator core 14, a step of pushing the numerous rectangular wire coils 40 into the stator core 14 is further needed.

Figures 5, 6:
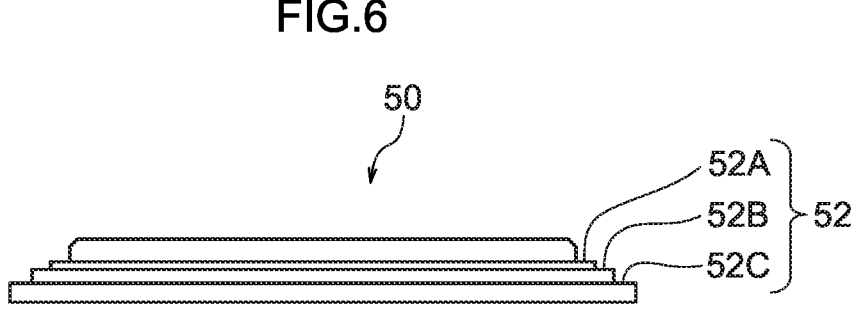
FIG. 5 is a plan view illustrating a first jig that is used in the push-in step.
FIG. 6 is a side view illustrating the first jig.

In the present embodiment, a push-in step of the numerous rectangular wire coils 40 is carried out by using a first jig 50 illustrated in FIG. 4 through FIG. 6 and a second jig

60 illustrated in FIG. 4. Due to this push-in step, the numerous rectangular wire coils 40 are pushed into the stator core 14 up to set positions.

The first jig 50 is formed in the shape of disk or the shape of a ring whose diameter is slightly smaller than the stator core 14. The second jig 60 is formed in the shape of a disk or the shape of a ring (here, the shape of a ring) having the same outer shape as the stator core 14. In the aforementioned push-in step, for example, the stator core 14 is supported at a bolster of an unillustrated press machine. The second jig 60 is mounted to a slide of the above-described press machine, and is disposed concentrically at an axial direction one side (the upper side in FIG. 4) with respect to the stator core 14. The first jig 50 is disposed concentrically at an axial direction another side (the lower side in FIG. 4) with respect to the stator core 14, and is supported by the bolster of the above-described press machine.

As illustrated in FIG. 5 and FIG. 6, a stepped portion 52 that is shaped in the form of steps heading downward toward the radial direction outer side is formed at the first jig 50. In the present embodiment, this stepped portion 52 has three steps 52A, 52B, 52C. These steps 52A, 52B, 52C are disposed so as to face the respective layers 46A, 46B, 46C of the numerous rectangular wire coils 40, respectively.

The second jig 60 is displaced by the above-described press machine toward the other side in the axial direction, and is made to abut the numerous rectangular wire coils 40 from the one side in the axial direction, and pushes the numerous rectangular wire coils 40 toward the other side in the axial direction. Due to this pushing, the numerous rectangular wire coils 40 are moved relatively toward (pushed-in toward) the other side in the axial direction with respect to the stator core 14. At the time of this pushing-in, the numerous rectangular wire coils 40 respectively abut the respective steps 52A, 52B, 52C at the stepped portion 52 of the first jig 50.

As described above, at the numerous rectangular wire coils 40, the leg portion 42A at one side in the peripheral direction is formed to be slightly longer in the axial direction than the leg portion 42B at the other side in the peripheral direction. Therefore, at the time when the numerous rectangular wire coils 40 are made to abut the stepped portion 52 of the first jig 50 as described above, at the respective layers 46A, 46B, 46C of the numerous rectangular wire coils 40, only the distal ends of the leg portions 42A at the one sides are respectively made to abut the respective steps 52A, 52B, 52C at the stepped portion 52 of the first jig 50. Due to this abutting, the positions of the distal ends of the leg portions 42A at the one sides in the respective layers 46A, 46B, 46C are arranged at the positions of the respective steps 52A, 52B, 52C. Thereafter, the second jig 60 is displaced by the above-described press machine toward the other side in the axial direction, and the numerous rectangular wire coils 40 are pushed-in up to the predetermined positions.

Figure 7A:
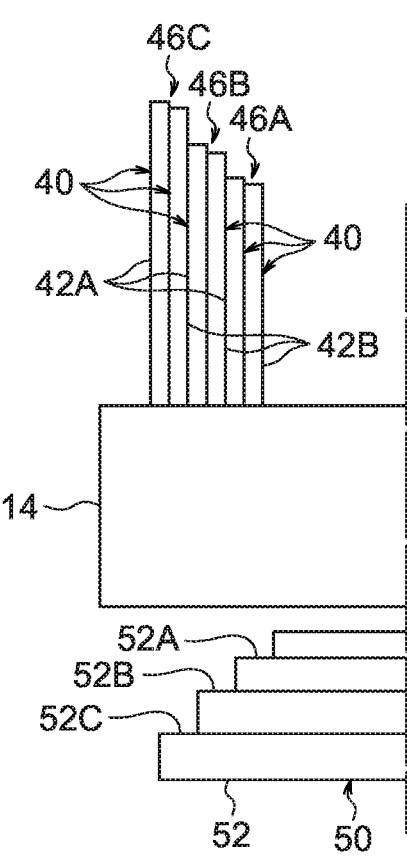
FIG. 7A is a first drawing for explaining a first push-in method of the push-in step.
Figure 7B:
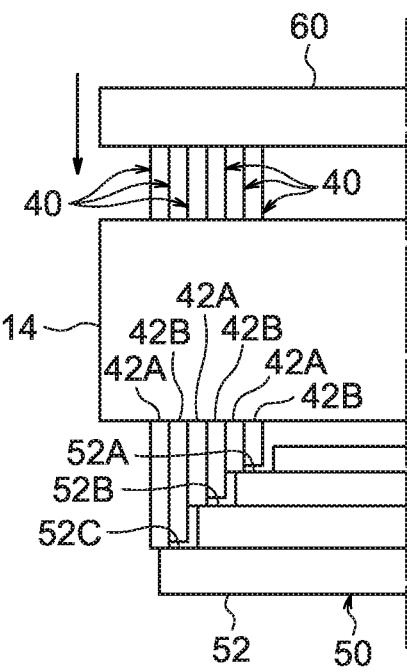
FIG. 7B is a second drawing for explaining the first push-in method of the push-in step.
Figures 7C, 8A:
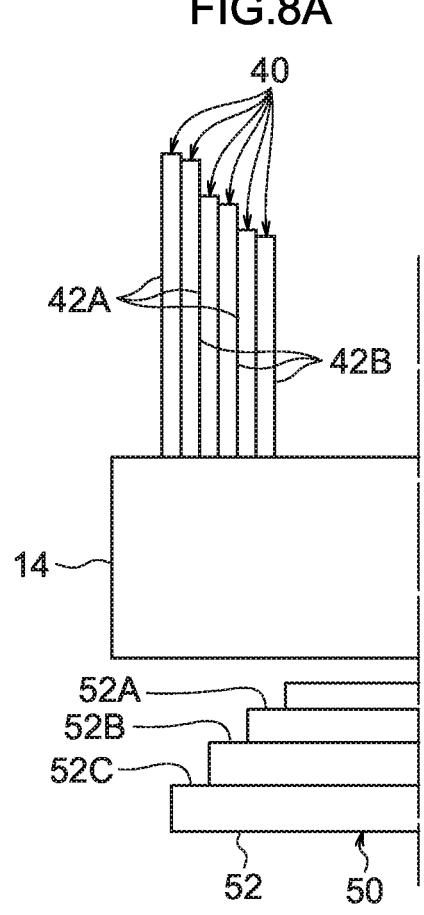
FIG. 7C is a third drawing for explaining the first push-in method of the push-in step.
FIG. 8A is a first drawing for explaining a second push-in method of the push-in step.
Figures 8B, 8C:
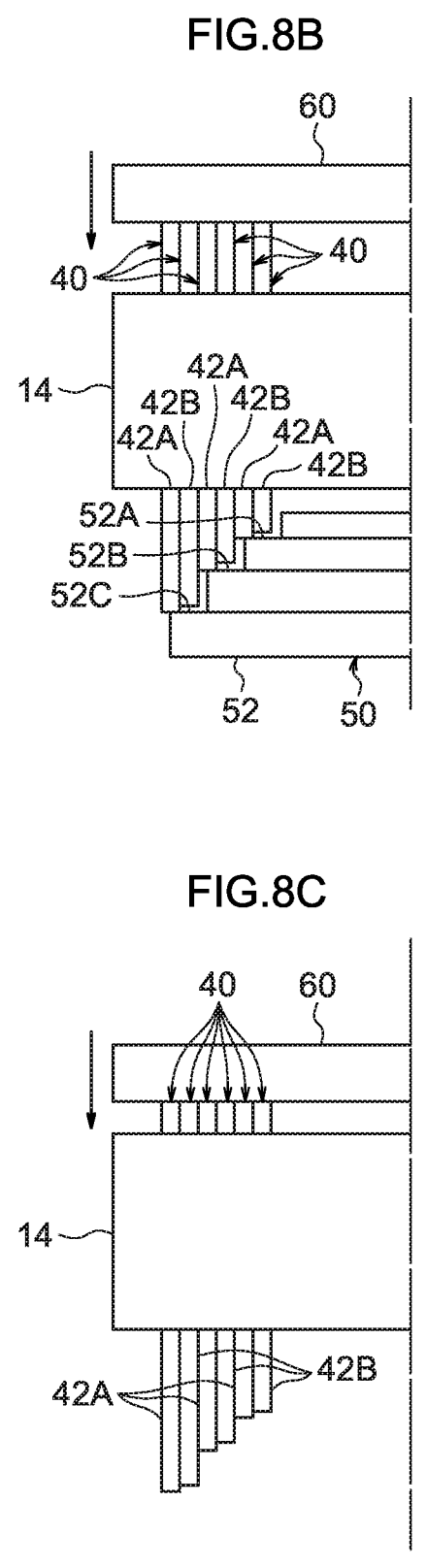
Figure 9A:
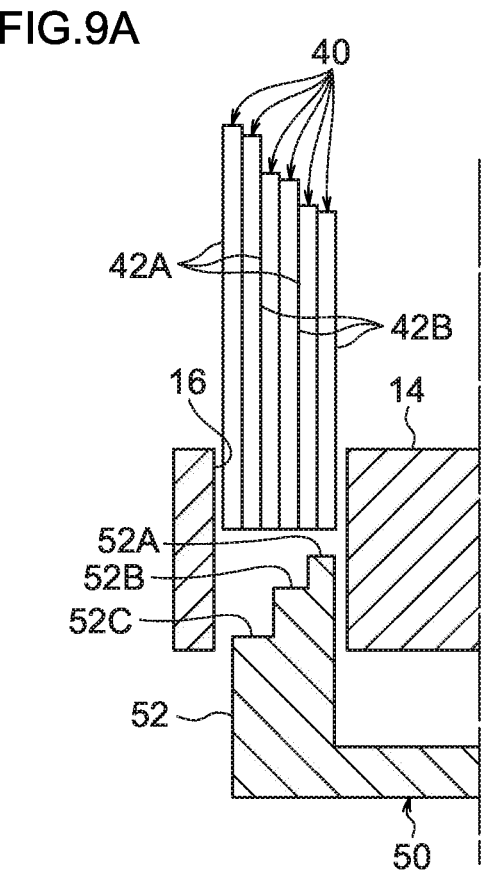
FIG. 9A is a first drawing for explaining a third push-in method of the push-in step.
Figure 9B:
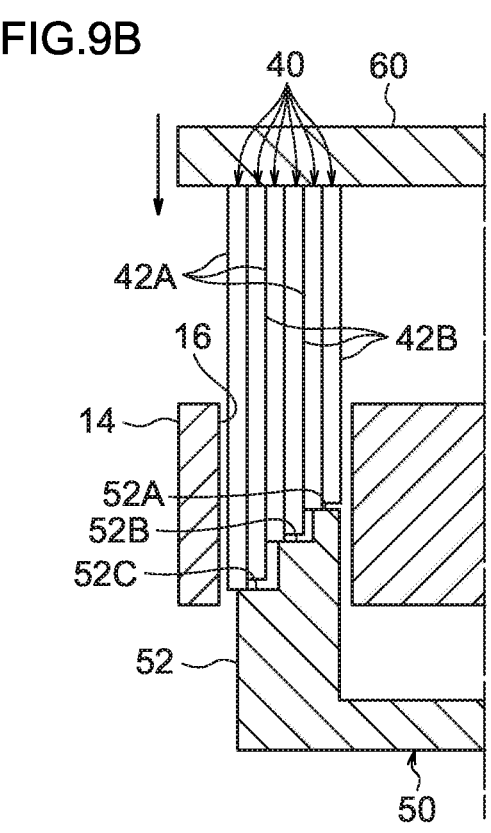
FIG. 9B is a second drawing for explaining the third push-in method of the push-in step.
Figure 9C:
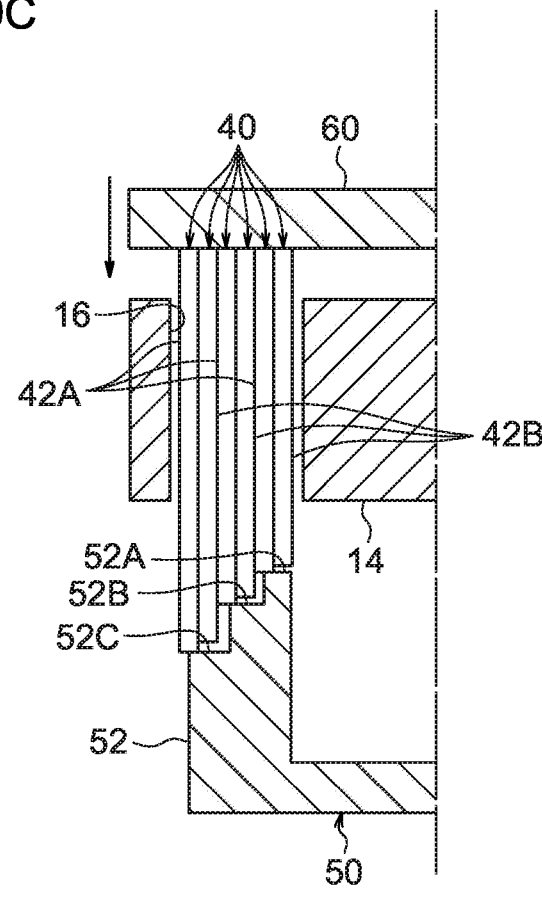
FIG. 9C is a third drawing for explaining the third push-in method of the push-in step.
Figure 10A:
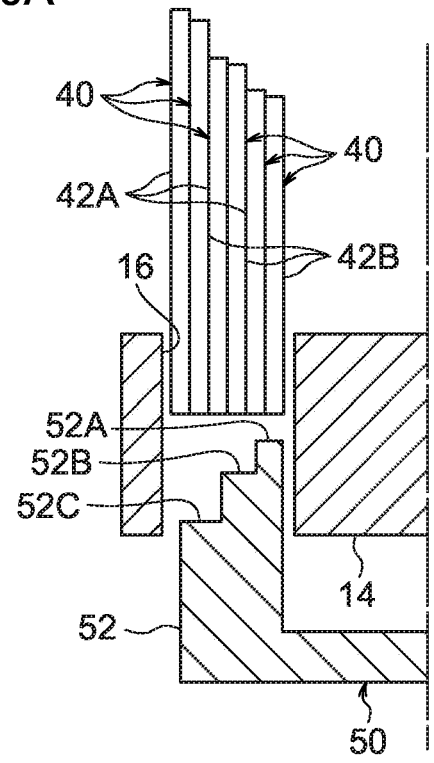
FIG. 10A is a first drawing for explaining a fourth push-in method of the push-in step.
Figure 10B:
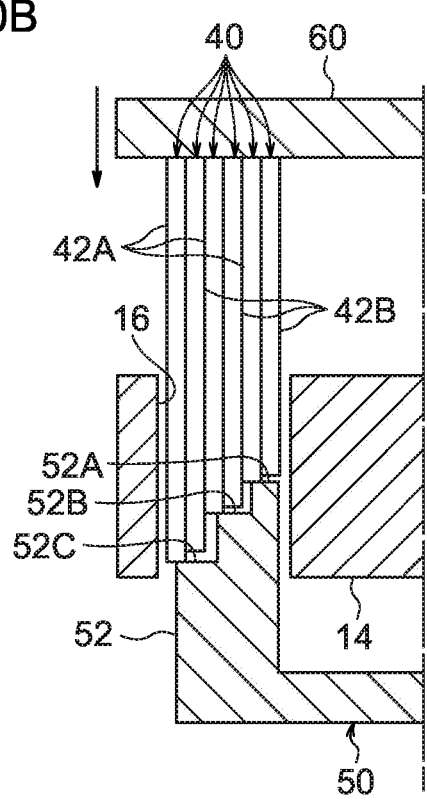
FIG. 10B is a second drawing for explaining the fourth push-in method of the push-in step.
Figure 10C:
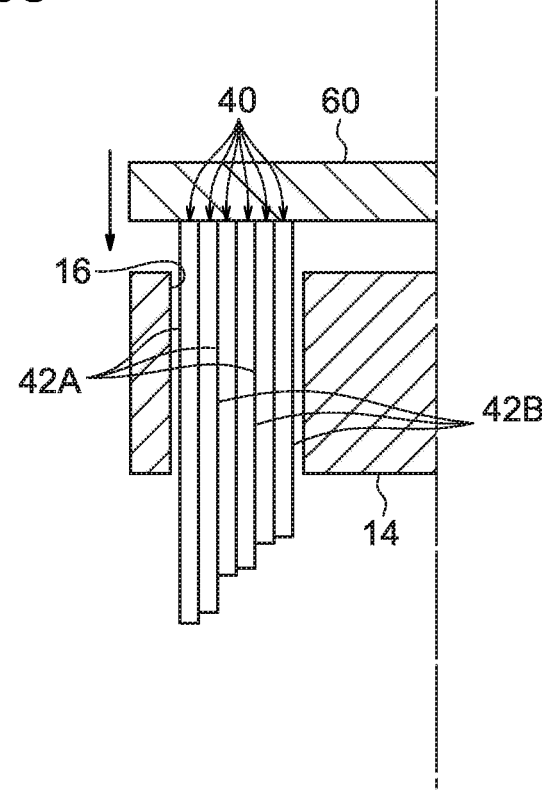
FIG. 10C is a third drawing for explaining the fourth push-in method of the push-in step.

The above-described push-in step can be carried out by a first push-in method illustrated in FIG. 7A through FIG. 7C, a second push-in method illustrated in FIG. 8A through FIG. 8C, a third push-in method illustrated in FIG. 9A through FIG. 9C, or a fourth push-in method illustrated in FIG. 10A through FIG. 10C.

In the first push-in method, first, as illustrated in FIG. 7A, the first jig 50 is placed at the axial direction another side with respect to the stator core 14. Next, as illustrated in FIG. 7B, the second jig 60 is made to abut the numerous rectangular wire coils 40 from the axial direction one side, and pushes the numerous rectangular wire coils 40 toward the axial direction another side, and causes them to abut the stepped portion 52 of the first jig 50. Next, as illustrated in FIG. 7C, the numerous rectangular wire coils 40 are moved toward the axial direction another side relative to the stator core 14, in the state in which the first jig 50 and the second jig 60 remain abutting the numerous rectangular wire coils 40.

In the second push-in method, first, as illustrated in FIG. 8A, the first jig 50 is placed at the axial direction another side with respect to the stator core 14. Next, as illustrated in FIG. 8B, the second jig 60 is made to abut the numerous rectangular wire coils 40 from the axial direction one side, and pushes the numerous rectangular wire coils 40 toward the axial direction another side, and causes them to abut the stepped portion 52 of the first jig 50. Next, as illustrated in FIG. 8C, the numerous rectangular wire coils 40 are moved toward the axial direction another side relative to the stator core 14, in a state in which the first jig 50 has been moved apart from the numerous rectangular wire coils 40. Note that, after the relative movement illustrated in FIG. 8C is completed, the second jig 60 may be moved apart from the numerous rectangular wire coils 40, and thereafter, the first jig 50 may again be made to abut the numerous rectangular wire coils 40.

In the third push-in method, as illustrated in FIG. 9A, the stepped portion 52 of the first jig 50 is formed so as to be able to be inserted into the respective slots 16 from the axial direction another side, and the stepped portion 52 is inserted into the respective slots 16. Next, as illustrated in FIG. 9B, the second jig 60 is made to abut the numerous rectangular wire coils 40 from the axial direction one side, and pushes the numerous rectangular wire coils 40 toward the axial direction another side, and causes them to abut the stepped portion 52 of the first jig 50. Next, as illustrated in FIG. 9C, the numerous rectangular wire coils 40 are moved toward the axial direction another side relative to the stator core 14, in the state in which the first jig 50 and the second jig 60 remain abutting the numerous rectangular wire coils 40. Note that, after the relative movement illustrated in FIG. 9C is completed, the first jig 50 and the second jig 60 may be moved apart from the numerous rectangular wire coils 40, and thereafter, the first jig 50 may again be made to abut the numerous rectangular wire coils 40.

In the fourth push-in method, in the same way as in the third push-in method, the stepped portion 52 of the first jig 50 is formed so as to be able to be inserted into the respective slots 16 from the axial direction another side, and the stepped portion 52 is inserted into the respective slots 16 (see FIG. 10A). Next, as illustrated in FIG. 10B, the second jig 60 is made to abut the numerous rectangular wire coils 40 from the axial direction one side, and pushes the numerous rectangular wire coils 40 toward the axial direction another side, and causes them to abut the stepped portion 52 of the first jig 50. Next, as illustrated in FIG. 10C, the numerous rectangular wire coils 40 are moved toward the axial direction another side relative to the stator core 14, in a state in which the first jig 50 has been moved apart from the numerous rectangular wire coils 40. Note that, after the relative movement illustrated in FIG. 10C is completed, the second jig 60 may be moved apart from the numerous rectangular wire coils 40, and thereafter, the first jig 50 may again be made to abut the numerous rectangular wire coils 40.

Overview of First Embodiment

In the first embodiment, the numerous rectangular wire coils 40, which are shaped in U-shapes having both leg portions 42A, 42B respectively inserted into the respective slots 16 of the stator core 14 from the axial direction one side of the stator core 14, are superposed in the plural layers 46A, 46B, 46C in the radial direction of the stator core 14 and are arrayed in annular forms. The lengths of the both leg portions 42A, 42B of the numerous rectangular wire coils 40 in the axial direction are set so as to become longer in a stepwise manner from the layer 46A at the inner side toward the layer 46C at the outer side of the plural layers 46A, 46B, 46C. Among the both leg portions 42A, 42B of each of the rectangular wire coils 40, the leg portion 42A at one side in the peripheral direction of the stator core 14 is formed to be longer in the axial direction than the leg portion 42B at the other side in the peripheral direction. Within each slot 16, at each of the respective layers 46A, 46B, 46C, the leg portion 42A at one side of one of the rectangular wire coils 40 is superposed, at the radial direction outer side, on the leg portion 42B that is at the other side of another of the rectangular wire coils 40.

The first jig 50, which has the stepped portion 52 that is shaped in the form of steps that head downward toward the radial direction outer side, is placed at the axial direction another side with respect to the numerous rectangular wire coils 40, and the respective steps 52A, 52B, 52C of the stepped portion 52 are made to face the respective layers 46A, 46B, 46C, respectively. The second jig 60 is made to abut the numerous rectangular wire coils 40 from the axial direction one side, and is pushed toward the axial direction another side. Among the leg portions 42A at the one sides and the leg portions 42B at the other sides of the respective layers 46A, 46B, 46C, only the distal ends of the leg portions 42A at the one sides respectively abut the respective steps 52A, 52B, 52C of the stepped portion 52. Due thereto, the positions of the distal ends of the leg portions 42A at the one sides of the respective layers 46A, 46B, 46C are arranged at the positions of the respective steps 52A, 52B, 52C. Therefore, even if there is dispersion in the shapes or dimensions of the numerous rectangular wire coils 40, dispersion arising in the positions of the distal ends of the leg portions 42A, 42B can be prevented or suppressed. As a result, it is easy to automate, for example, the aforementioned post-process of bending the distal end sides of the respective leg portions 42A, 42B toward the outer side in the radial direction into substantial crank shapes.

Figure 11A:
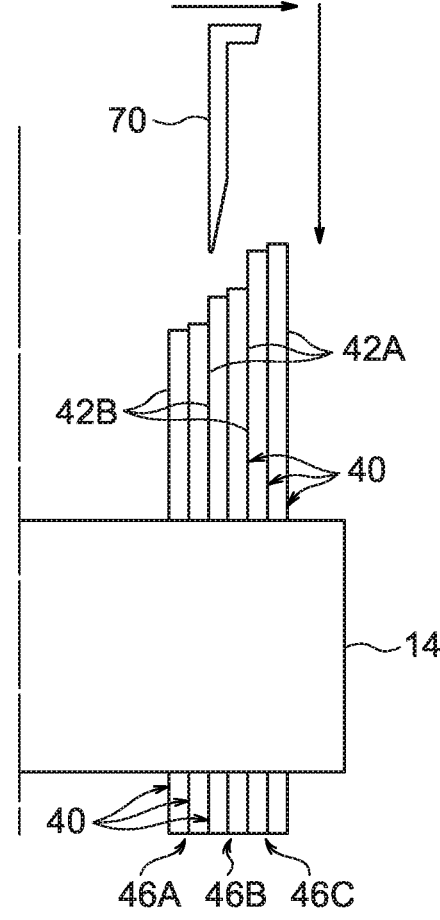
FIG. 11A is a first drawing for explaining a bending step that is after the push-in step.
Figure 11B:
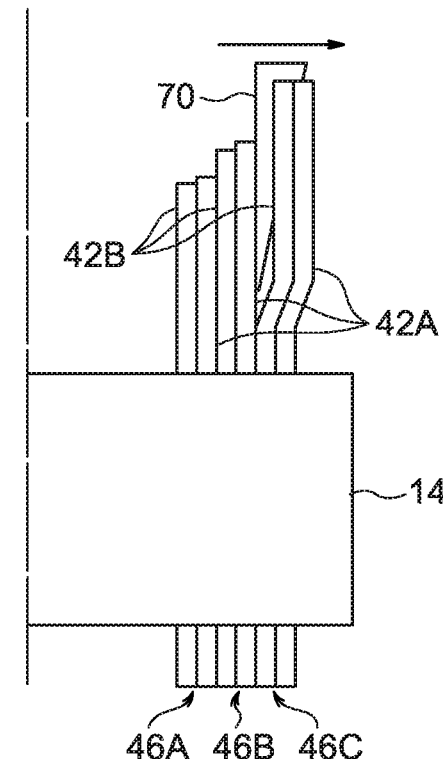
FIG. 11B is a second drawing for explaining the bending step.

Specifically, in the aforementioned post-process (bending process), as illustrated in FIG. 11A and FIG. 11B, a claw member 70 is displaced in the radial direction and the axial direction of the stator core 14, and is inserted in between the layer 46A and the layer 46B. Thereafter, the claw member 70 is displaced toward the outer side in the radial direction of the stator core 14. Due thereto, the distal end sides of the leg portions 42A, 42B of the layer 46A are bent toward the radial direction outer side of the stator core 14. In this bending process, if there is dispersion in the positions of the distal ends of the leg portions 42A, 42B, automatic control of the driving device that drives the claw member 70 is unstable, and automation is difficult. However, in the present embodiment, automation is easy. Note that, in FIG. 11A and FIG. 11B, the stator core 14 is turned upside-down such that the axial direction one side of the stator core 14 is directed downward.

Moreover, in the present embodiment, at the respective layers 46A, 46B, 46C, the leg portions 42A at the one sides are superposed on the radial direction outer sides of the leg portions 42B at the other sides that are shorter in the axial direction than those leg portions 42A at the one sides. Due thereto, in the aforementioned post-process, as illustrated in FIG. 11B, the positions of the distal ends of the both leg portions 42A, 42B can be arranged in a state in which the distal end sides of the leg portions 42A, 42B of the layer 46A are bent in substantial crank shapes toward the radial direction outer side.

Further, in the above-described first and third push-in methods, the numerous rectangular wire coils 40 are moved toward the axial direction another side relative to the stator core 14, in the state in which the first jig 50 and the second jig 60 have been made to abut the numerous rectangular wire coils 40. Due to this relative movement, the numerous rectangular wire coils 40 are pushed-in toward the other side in the axial direction with respect to the stator core 14. Due to this pushing-in being carried out in the above-described abutting state, dispersion arising in the positions of the distal ends of the leg portions 42A, 42B of the numerous rectangular wire coils 40 after the pushing-in can be prevented or suppressed.

Further, in the above-described second and fourth pushing-in methods, the first jig 50 and the second jig 60 are made to abut the numerous rectangular wire coils 40, and the positions of the distal ends of the leg portions 42A at the one sides of the numerous rectangular wire coils 40 are arranged at the positions of the respective steps 52A, 52B, 52C at the stepped portion 52 of the first jig 50. Thereafter, due to the above-described relative movement being carried out in a state in which the first jig 50 has been moved apart from the numerous rectangular wire coils 40, the numerous rectangular wire coils 40 are pushed-in toward the other side in the axial direction with respect to the stator core 14. This pushing-in is carried out in the state in which the positions of the distal ends of the leg portions 42A at the one sides of the respective rectangular wire coils 40 are arranged as described above. Therefore, dispersion arising in the positions of the distal ends of the leg portions 42A, 42B of the numerous rectangular wire coils 40 after the pushing-in can be prevented or suppressed.

Further, in the above-described third and fourth push-in methods, the stepped portion 52 of the first jig 50 can be inserted in the respective slots 16 from the axial direction another side of the stator core 14. The numerous rectangular wire coils 40 are made to abut the respective steps 52A, 52B, 52C of the stepped portion 52 that has been inserted into the respective slots 16. In this way, the abutting of the numerous rectangular wire coils 40 with the respective steps 52A, 52B, 52C of the stepped portion 52 is carried out within the respective slots 16, and therefore, it is easy to make the numerous rectangular wire coils 40 accurately abut the respective steps 52A, 52B, 52C.

Other embodiments of the present disclosure are described next. Note that structures and operations that are basically similar to those of the first embodiment are denoted by the same reference numerals as in the first embodiment, and description thereof is omitted.

Second Embodiment

Figure 12:
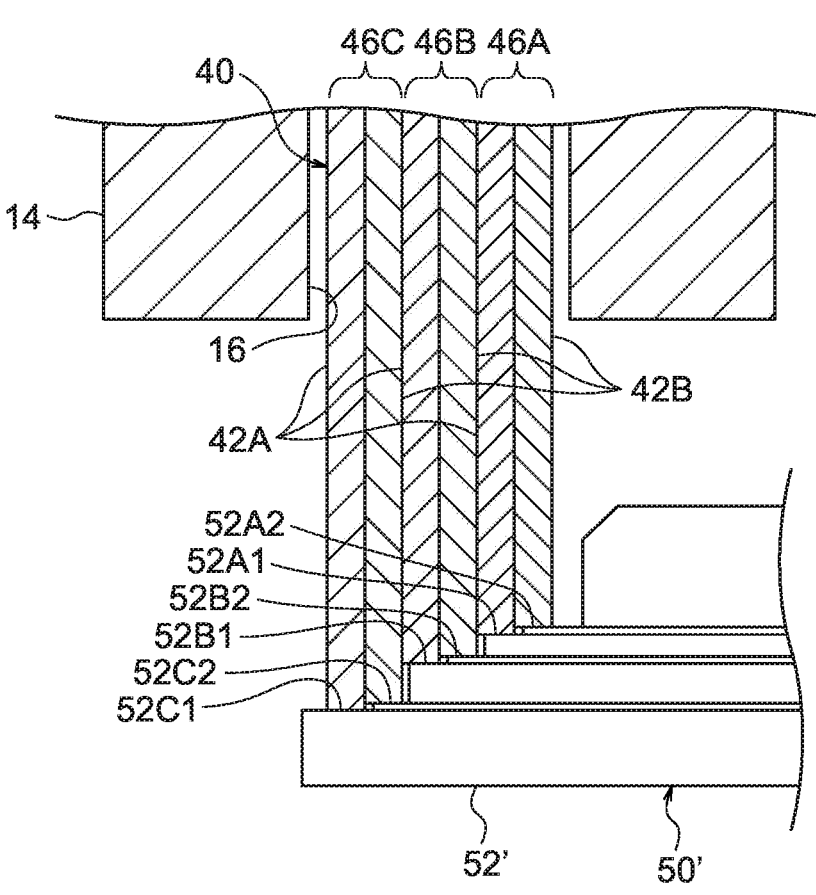
FIG. 12 is a cross-sectional view illustrating the structure of a periphery including a portion of a first jig that is used in a method of manufacturing a stator relating to a second embodiment.

The structure of the periphery including a portion of a first jig 50', which is used in a method of manufacturing a stator relating to a second embodiment of the present disclosure, is illustrated in a cross-sectional view in FIG. 12. Steps 52A1, 52B1, 52C1 whose heights in the axial direction are tall, and steps 52A2, 52B2, 52C2 whose heights in the axial direction are short, are formed so as to be lined-up alternately at a stepped portion 52' of this first jig 50'. The distal ends of the leg portions 42A at the one sides at the respective layers 46A, 46B, 46C are made to abut the steps 52A1, 52B1, 52C1 whose heights in the axial direction are tall, and the distal ends of the leg portions 42B at the other sides at the respective layers 46A, 46B, 46C are made to abut the steps 52A2, 52B2, 52C2 whose heights in the axial direction are short.

Namely, in this embodiment, the distal ends of the respective leg portions 42A, 42B at the respective layers 46A, 46B, 46C are respectively made to abut the respective steps 52A1, 52A2, 52B1, 52B2, 52C1, 52C2. Due thereto, the positions of the distal ends of the respective leg portions 42A, 42B of the respective layers 46A, 46B, 46C are arranged at the positions of the respective steps 52A1, 52A2, 52B1, 52B2, 52C1, 52C2, and the positions of the distal ends of the respective leg portions 42A, 42B can be arranged more reliably.

Third Embodiment

Figures 13A, 13B:
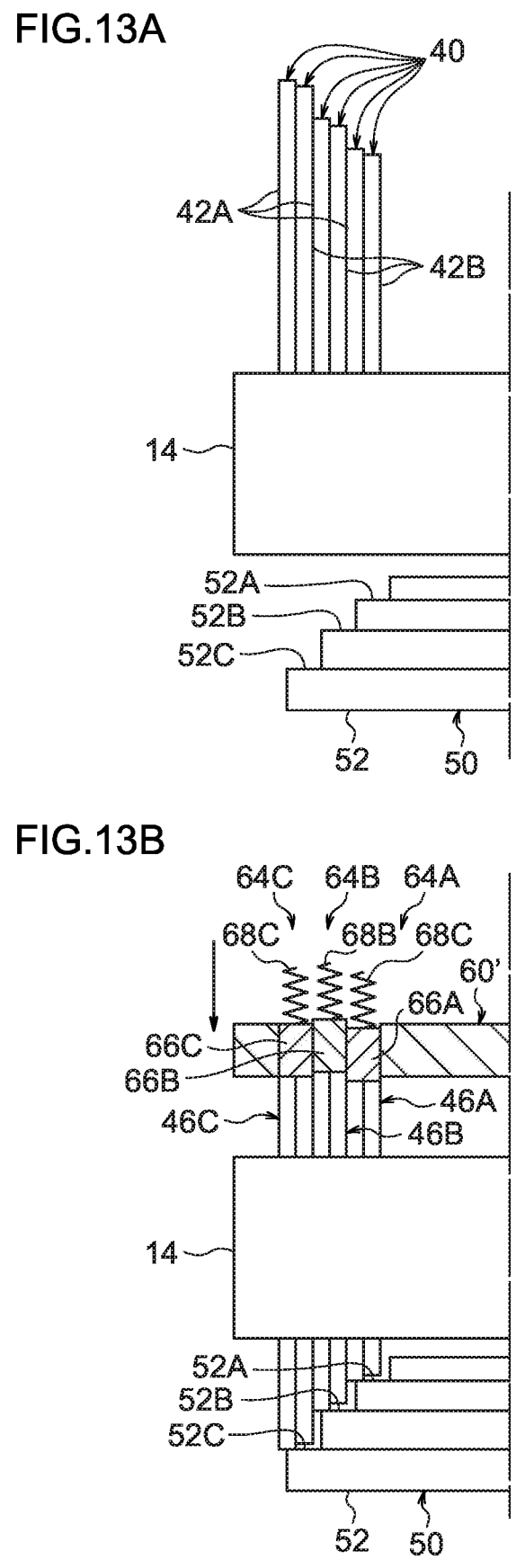
Figure 13C:
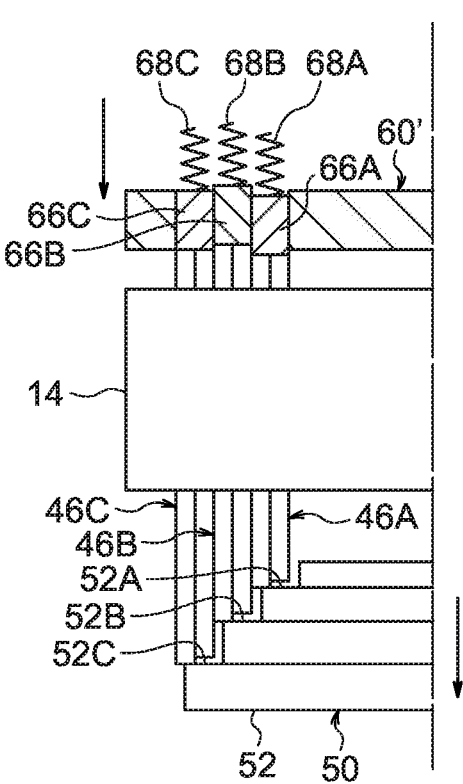
FIG. 13C is a third drawing for explaining the push-in step in the method of manufacturing a stator relating to the third embodiment.

A first drawing for explaining a push-in step in a method of manufacturing a stator relating to a third embodiment is illustrated in FIG. 13A, a second drawing for explaining the push-in step is illustrated in FIG. 13B, and a third drawing for explaining the push-in step is illustrated in FIG. 13C. In this embodiment, a second jig 60' has plural (here, three) urging portions 64A, 64B, 64C that urge the numerous rectangular wire coils 40 toward the axial direction another side per layer 46A, 46B, 46C. The plural urging portions 64A, 64B, 64C are structured by plural sliders 66A, 66B, 66C that are supported so as to be slidable in the axial direction with respect to a main body portion 62 of the second jig 60', and plural urging members 68A, 68B, 68C that urge the plural sliders 66A, 66B, 66C toward the axial direction another side. The plural sliders 66A, 66B, 66C may each be divided into plural segments in the peripheral direction. The plural urging members 68A, 68B, 68C are springs as an example, but may be rubber, or may be plural hydraulic cylinders that are lined-up in the peripheral direction. In this embodiment, in accordance with the dispersion in the shapes or dimensions of the numerous rectangular wire coils 40, the urging members 68A, 68B, 68C elastically deform, and the sliders 66A, 66B, 66C slide in the axial direction with respect to the main body portion 62. Due thereto, the machining dispersion of the respective rectangular wire coils 40 can be absorbed.

Although the present disclosure has been described above by exemplifying several embodiments, the present disclosure can be implemented by being modified in various ways within a scope that does not depart from the gist thereof. Further, the scope of the right of the present disclosure is, of course, not limited by the above-described embodiments.

For example, the numerous rectangular wire coils 40 that are inserted in the numerous slots 16 of the stator core 14 may be pushed toward the axial direction another side by the second jig 60, and moved toward the axial direction another side relative to the stator core 14, and thereafter, the numerous rectangular wire coils 40 may be made to abut the first jig 50 in a state in which the second jig 60 has been moved apart from the numerous rectangular wire coils 40. Due to this abutment, the positions of the distal ends of the leg portions 42A, 42B of the numerous rectangular wire coils 40 can be arranged.

The disclosure of Japanese Patent Application No. 2021-123669 filed on Jul. 28, 2021 is, in its entirety, incorporated by reference into the present specification. All publications, patent applications, and technical standards mentioned in the present specification are incorporated by reference into the present specification to the same extent as if such individual publication, patent application, or technical standard was specifically and individually indicated to be incorporated by reference.

The invention claimed is:

1. A method of manufacturing a stator in which numerous rectangular wire coils, which are shaped in U-shapes having both leg portions respectively inserted into respective slots of a stator core from one side in an axial direction of the stator core, are superposed in a plurality of layers in a radial direction of the stator core and are arrayed in annular forms, the method comprising:

setting lengths in the axial direction of the both leg portions of the rectangular wire coils such that the lengths become longer in a stepwise manner from a layer at an inner side toward a layer at an outer side of the plurality of layers;

of the both leg portions of each of the rectangular wire coils, forming a leg portion at one side in a peripheral direction of the stator core to be longer in the axial direction than a leg portion at another side in the peripheral direction;

within each of the slots, at each of the respective layers, superposing the leg portion at the one side of one of the rectangular wire coils on an outer side in the radial direction of the leg portion at the other side of another of the rectangular wire coils;

placing a first jig, which has a stepped portion shaped in a form of steps heading downward toward an outer side in the radial direction, at another side in the axial direction with respect to the numerous rectangular wire coils, and making respective steps of the stepped portion face the layers, respectively;

causing a second jig to abut the numerous rectangular wire coils from the one side in the axial direction, and pushing the second jig toward the other side in the axial direction; and of the leg portions at the one sides and the leg portions at the other sides of the respective layers, causing only distal ends of the leg portions at the one sides to abut the steps, respectively.

2. The method of manufacturing a stator of claim 1, wherein the numerous rectangular wire coils are moved toward the other side in the axial direction relative to the stator core, in a state in which the first jig and the second jig are made to abut the numerous rectangular wire coils.

3. The method of manufacturing a stator of claim 1, wherein, after the first jig and the second jig are made to abut the numerous rectangular wire coils, the numerous rectangular wire coils are moved toward the other side in the axial direction relative to the stator core in a state in which the first jig has been moved apart from the numerous rectangular wire coils.

4. The method of manufacturing a stator of claim 2, wherein the stepped portion of the first jig is formed so as to be able to be inserted into the respective slots from the other side in the axial direction, and the numerous rectangular wire coils are made to abut the respective steps of the stepped portion that is inserted in the respective slots.

5. A method of manufacturing a stator in which numerous rectangular wire coils, which are shaped in U-shapes having both leg portions respectively inserted into respective slots of a stator core from one side in an axial direction of the stator core, are superposed in a plurality of layers in a radial direction of the stator core and are arrayed in annular forms, the method comprising:

setting lengths in the axial direction of the rectangular wire coils such that the lengths become longer in a stepwise manner from a layer at an inner side toward a layer at an outer side of the plurality of layers;

of the both leg portions of each of the rectangular wire coils, forming a leg portion at one side in a peripheral direction of the stator core to be longer in the axial direction than a leg portion at another side in the peripheral direction;

within each of the slots, at each of the respective layers, superposing the leg portion at the one side of one of the rectangular wire coils on an outer side in the radial direction of the leg portion at the other side of another of the rectangular wire coils;

placing a first jig, which has a stepped portion shaped in a form of steps heading downward toward an outer side in the radial direction, at another side in the axial direction with respect to the numerous rectangular wire coils, and making respective steps of the stepped portion face the leg portions of the respective layers, respectively;

causing a second jig to abut the numerous rectangular wire coils from the one side in the axial direction, and pushing the second jig toward the other side in the axial direction; and causing distal ends of the leg portions of the respective layers to abut the steps, respectively.

6. The method of manufacturing a stator of claim 5, wherein:

the stepped portion of the first jig is formed such that steps whose heights in the axial direction are tall and steps whose heights in the axial direction are short are lined-up alternately, and the leg portions at the one sides are made to abut the steps whose heights in the axial direction are tall, and the leg portions at the other sides are made to abut the steps whose heights in the axial direction are short.

7. The method of manufacturing a stator of claim 1, wherein the second jig has a plurality of urging portions that urge the numerous rectangular wire coils toward the other side in the axial direction per layer.

8. The method of manufacturing a stator of claim 1, wherein, after the numerous rectangular wire coils are pushed by the second jig toward the other side in the axial direction and are moved toward the other side in the axial direction relative to the stator core, the numerous rectangular wire coils are made to abut the first jig in a state in which the second jig has been moved apart from the numerous rectangular wire coils.

9. The method of manufacturing a stator of claim 3, wherein the stepped portion of the first jig is formed so as to be able to be inserted into the respective slots from the other side in the axial direction, and the numerous rectangular wire coils are made to abut the respective steps of the stepped portion that is inserted in the respective slots.

10. The method of manufacturing a stator of claim 5, wherein the second jig has a plurality of urging portions that urge the numerous rectangular wire coils toward the other side in the axial direction per layer.

11. The method of manufacturing a stator of claim 5, wherein, after the numerous rectangular wire coils are pushed by the second jig toward the other side in the axial direction and are moved toward the other side in the axial direction relative to the stator core, the numerous rectangular wire coils are made to abut the first jig in a state in which the second jig has been moved apart from the numerous rectangular wire coils.

* * * * *